(12) United States Patent
Zou et al.

(10) Patent No.: US 10,402,670 B2
(45) Date of Patent: Sep. 3, 2019

(54) PARALLEL SCENE PRIMITIVE DETECTION USING A SURROUND CAMERA SYSTEM

(71) Applicant: GM GLOBAL TECHNOLOGY OPERATIONS LLC, Detroit, MI (US)

(72) Inventors: Guangyu J. Zou, Warren, MI (US);
Upali P. Mudalige, Oakland Township, MI (US); Jinsong Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 52 days.

(21) Appl. No.: 15/487,753

(22) Filed: Apr. 14, 2017

(65) Prior Publication Data
US 2017/0300767 A1    Oct. 19, 2017

Related U.S. Application Data

(60) Provisional application No. 62/324,596, filed on Apr. 19, 2016.

(51) Int. Cl.
| | |
|---|---|
| *G06K 9/00* | (2006.01) |
| *B60R 1/00* | (2006.01) |
| *G06K 9/46* | (2006.01) |
| *G06K 9/62* | (2006.01) |
| *H04N 5/247* | (2006.01) |

(52) U.S. Cl.
CPC ............ *G06K 9/00986* (2013.01); *B60R 1/00* (2013.01); *G06K 9/00791* (2013.01); *G06K 9/4619* (2013.01); *G06K 9/6269* (2013.01); *H04N 5/247* (2013.01); *B60R 2300/102* (2013.01); *B60R 2300/105* (2013.01); *B60R 2300/607* (2013.01); *B60R 2300/8033* (2013.01); *B60R 2300/8093* (2013.01)

(58) Field of Classification Search
None
See application file for complete search history.

(56) References Cited

U.S. PATENT DOCUMENTS

| | | | | |
|---|---|---|---|---|
| 9,704,054 B1 * | 7/2017 | Tappen | .................... | G06K 9/46 |
| 2011/0126255 A1 * | 5/2011 | Perlman | .................. | H04N 7/24 |
| | | | | 725/116 |
| 2014/0289445 A1 * | 9/2014 | Savich | ................ | G06F 13/4022 |
| | | | | 710/317 |

(Continued)

*Primary Examiner* — Delomia L Gilliard
(74) *Attorney, Agent, or Firm* — Cantor Colburn LLP (57) ABSTRACT

Techniques for road scene primitive detection using a vehicle camera system are disclosed. In one example implementation, a computer-implemented method includes receiving, by a processing device having at least two parallel processing cores, at least one image from a camera associated with a vehicle on a road. The processing device generates a plurality of views from the at least one image that include a feature primitive. The feature primitive is indicative of a vehicle or other road scene entities of interest. Using each of the parallel processing cores, a set of primitives are identified from one or more of the plurality of views. The feature primitives are identified using one or more of machine learning and classic computer vision techniques. The processing device outputs, based on the plurality of views, result primitives based on the plurality of identified primitives from multiple views based on the plurality of identified entities.

20 Claims, 6 Drawing Sheets

(56) References Cited

U.S. PATENT DOCUMENTS

| | | | | |
|---|---|---|---|---|
| 2015/0145995 | A1* | 5/2015 | Shahraray | H04W 4/70 348/148 |
| 2017/0206434 | A1* | 7/2017 | Nariyambut Murali | G06K 9/628 |
| 2017/0236051 | A1* | 8/2017 | van der Made | G06N 3/049 706/27 |
| 2017/0371329 | A1* | 12/2017 | Giering | G05B 23/0254 |
| 2018/0032082 | A1* | 2/2018 | Shalev-Shwartz | G05D 1/0221 |
| 2018/0139431 | A1* | 5/2018 | Simek | H04N 5/2258 |

* cited by examiner

PARALLEL SCENE PRIMITIVE DETECTION USING A SURROUND CAMERA SYSTEM

CROSS REFERENCE TO RELATED APPLICATION

This application claims the benefit of priority of U.S. Provisional Application No. 62/324,596 filed Apr. 19, 2016, the disclosure of which is incorporated herein by reference in its entirety.

INTRODUCTION

The present disclosure relates generally to a vehicle multi-camera system and more particularly to a surround view camera system for primitive detection, classification, and tracking in parallel.

A vehicle, such a car, motorcycle, a boat, or any other type of automobile may be equipped with one or more cameras to provide external views of the vehicle to a driver, other occupants of the vehicle, and the perception system of automated vehicles. For example, a vehicle can include front, side, and/or rear cameras. Vehicles with cameras on all sides can implement a surround view camera system that provides a "bird's eye" or "top" view of the vehicle and its surroundings. Images from the cameras can be presented to the driver or another occupant of the vehicle on a display within the vehicle, such as on the dash, center stack, heads up display, etc. Additionally, images from the cameras can be used to detect objects and road features that are external to the vehicle.

SUMMARY

In one exemplary embodiment, a computer-implemented parallelization method for detecting primitives is described. The method includes receiving, by a processing device having at least two parallel processing cores, at least one image from a camera associated with a vehicle on a road. The processing device generates a plurality of views from the at least one image that include a feature primitive. The feature primitive is indicative of one or more road scene entity of interest. Using each of the parallel processing cores, the processing device identifies a feature primitive from one or more of the plurality of views. The road scene entity is identified using one or more of machine learning and a computer vision technique. The processing device outputs, based on the plurality of views, a set of result road scene primitives in parallel. The set of result road scene primitives are based on the identified road scene entity.

In another exemplary embodiment, a system for parallel primitive detection, is described. The system includes a plurality of cameras associated with a vehicle, a memory having computer readable instructions, and a processing device having at least two parallel processing cores. The processing device is configured to receive at least one image from a camera associated with a vehicle on a road. The processing device generates a plurality of views from the at least one image that include a feature primitive. The feature primitive is indicative of one or more road scene entities of interest. Using each of the parallel processing cores, the processing device identifies a road scene entity from one or more of the plurality of views. The feature primitives are identified using one or more of machine learning and a computer vision technique. The processing device outputs, based on the plurality of views, a set of result road scene primitives in parallel. The set of result road scene primitives are based on the identified road scene entity.

In yet another exemplary embodiment a computer program product for parallel scene primitive detection includes a computer readable storage medium having program instructions embodied therewith. The program instructions are executable by a processing device to cause the processing device to perform a method. The method includes receiving, by a processing device having at least two parallel processing cores, at least one image from a camera associated with a vehicle on a road. The processing device generates a plurality of views from the at least one image that include a feature primitive. The feature primitive is indicative of one or more road scene entity of interest. Using each of the parallel processing cores, the processing device identifies a feature primitive from one or more of the plurality of views. The road scene entity is identified using one or more of machine learning and a computer vision technique. The processing device outputs, based on the plurality of views, a set of result road scene primitives in parallel. The set of result road scene primitives are based on the identified road scene entity.

In addition to one or more of the features described herein, according to another embodiment, the result feature primitive indicates a road scene entity that can be a pedestrian, a traffic sign, a traffic signal, and a road feature.

In another exemplary embodiment, the machine learning utilizes a convolutional neural network.

In another exemplary embodiment, identifying the road scene entity at each parallel processing core further includes performing, at each parallel processing core, a feature extraction to extract the road scene entity from one view using a neural network. The processing device performs a classification of the road scene entity using the neural network.

In yet another exemplary embodiment, one or more of the parallel processing cores identifies a different road scene entity from a different view than another of the parallel processing cores.

In another exemplary embodiment, one parallel processing core analyzes a different view than another of the parallel processing cores.

In another exemplary embodiment, the camera includes a fisheye lens.

The above features and advantages, and other features and advantages of the disclosure, are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIGS. 3 and 4 depict neural networks used for detecting primitives, according to aspects of the present disclosure;

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for generic road scene primitive detection in parallel using a camera of a vehicle. For example, the present techniques use a surround camera system of a vehicle to detect, track, and classify close range road features reliability and in real-time. Road features include lane marks, traffic direction control indicators, curbs, shoulders, and the like that are located on or about the road surface. To detect road features, the present techniques implement a deep learning network to enable multiple road feature detection and classification in parallel as one step and in real-time. In some examples, the road features can be fused with other in-vehicle sensors/data (e.g., long range sensors, other cameras, LIDAR sensors, maps, etc.) to improve detection and classification accuracy and robustness. In additional examples, the road features can be used for self-mapping and crowdsourcing to generate and/or update a road feature database.

As used herein, feature primitives may include a vehicle, a pedestrian, a traffic sign or signal, road or lane marking (for single or multiple lanes), curbs, shoulders, etc. In some aspects feature primitives can be objects, road/lane features that are reliably detected in real-time, even if the road/lane features are partially occluded by surrounding vehicles or objects. Because multiple cameras record overlapping portions of the same objects, one or more images are used to detect the same primitive. In other aspects, multiple primitives can be detected, identified, and output using a single source image.

Processing resources present a challenge when detecting multiple road scene primitives indicative of road scene entities of interest from high-resolution camera images/data. Existing approaches use multiple algorithms instead of one unified deep neural network to detect the objects, traffic signs, road features, etc. Existing algorithms take in one or more image at a time as the elementary data input. Such existing approaches are hardware/processor intensive, time-consuming, fall short in exploiting modern many-core processing chip architecture, and may not be advantageous in some processing scenarios.

Example embodiments of the disclosure include or yield various technical features, technical effects, and/or improvements to technology. Example embodiments of the disclosure provide a highly parallel mechanism for primitive detection using machine learning to address computational inefficiency and accuracy issues in existing scene primitive detection in general. More particularly, the embodiments described herein detect road scene primitives, such as pedestrians, traffic signs, traffic signals, and road features, based on an image from a camera associated with a vehicle on the road, generating multiple views from the image that includes a feature primitive indicative of a vehicle and/or another object, and identifying (e.g., using deep learning) the primitive that indicates a road scene entity of interest in parallel using at least two parallel processing cores, and outputting a result based on the an aggregation of the feature primitives. The processing device outputs, based on the plurality of views, a set of result road scene primitives in parallel. The set of result road scene primitives are based on the identified road scene entity. These aspects of the disclosure constitute technical features that yield the technical effect of reducing overall computational load, power consumption, hardware costs, and time.

Accordingly, the present techniques improve the functioning of processing systems used to detect road scene primitives as described herein. As a result of these technical features and technical effects, the techniques described herein represent an improvement to existing road feature detection techniques. It should be appreciated that the above examples of technical features, technical effects, and improvements to technology of example embodiments of the disclosure are merely illustrative and not exhaustive.

Figure 1:
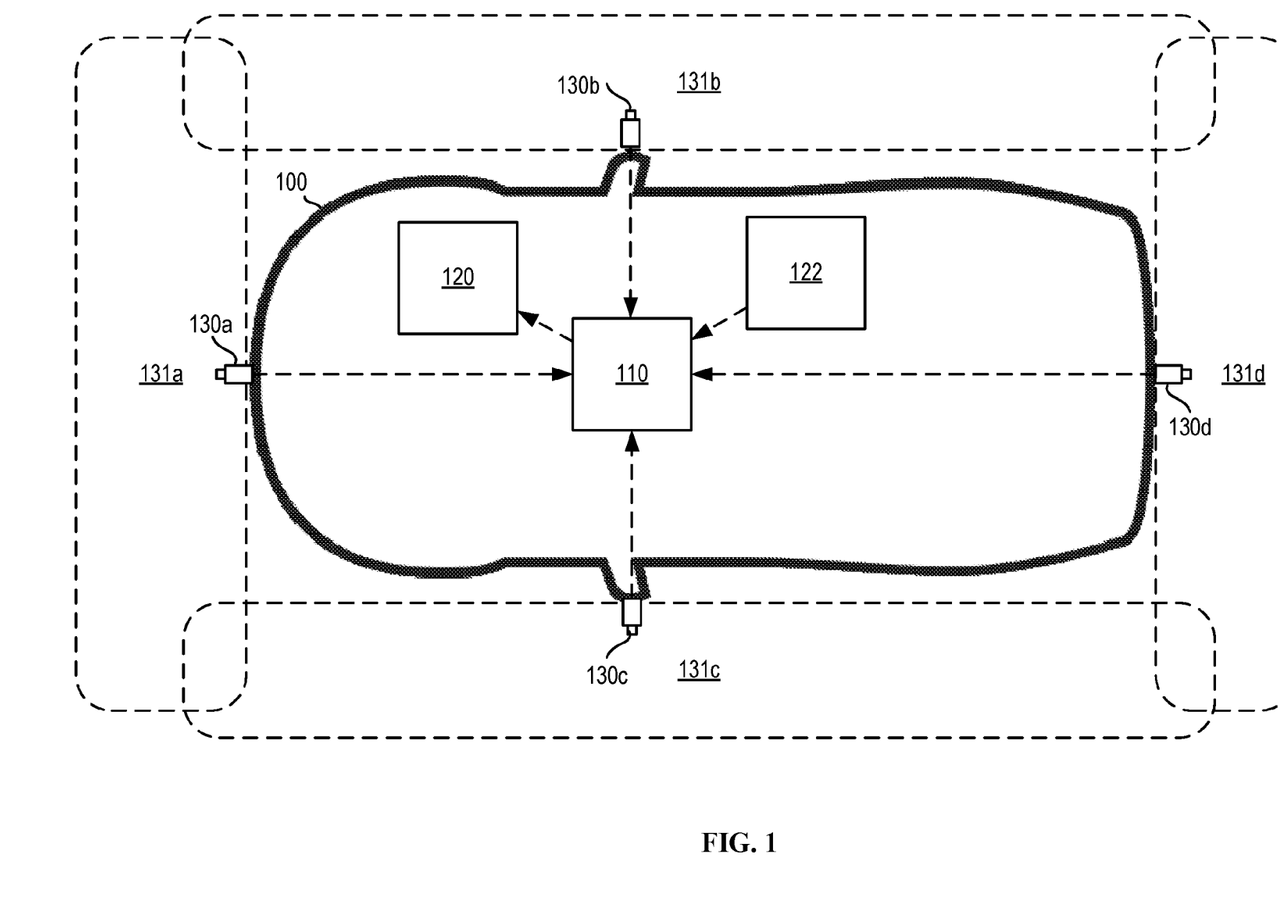
FIG. 1 depicts a vehicle including a processing system for primitive detection, according to aspects of the present disclosure.

FIG. 1 depicts a vehicle 100 including a processing system 110 for road scene primitive detection, according to aspects of the present disclosure. In addition to the processing system 110, the vehicle 100 includes a display 120, a sensor 122, and cameras 130a, 130b, 130c, 130d (collectively referred to herein as "cameras 130"). The vehicle 100 can be a car, truck, van, bus, motorcycle, boat, plane, or another suitable vehicle 100.

The cameras 130 capture images external to the vehicle 100. Each of the cameras 130 has a field-of-view (FOV) 131a, 131b, 131c, 131d (collectively referred to herein as "FOV 131"). The FOV is the area observable by a camera. For example, the camera 130a has a FOV 131a, the camera 131b has a FOV 131b, the camera 130c has a FOV 131c, and the camera 131d has a FOV 131d. The captured images can be the entire FOV for the camera or can be a portion of the FOV of the camera.

According to aspects of the present disclosure, although four cameras 130a-130d are shown, different numbers of cameras (e.g., 2 cameras, 3 cameras, 5 cameras, 8 cameras, 9 cameras, etc.) can be implemented. The captured images can be displayed on the display 120 to provide external views of the vehicle 100 to the driver/operator or another occupant of the vehicle 100. The captured images can be displayed on the display 120 as live images, still images, or some combination thereof. The display 120 can be a full display mirror (FDM) which is enabled to display images from one or more of the cameras 130. The FDM can be a traditional mirror in one mode or can be a display 120 for displaying digital images in another mode.

It should be appreciated that the captured image(s) can be an image from one of the cameras 130a-130d and/or can be a combination of images from more than one of the cameras 130a-130d. According to embodiments of the present disclosure, the captured images from the cameras 130 can be combined to form a vertical view and/or "bird's eye" view that provides a surround view around the vehicle 100. In other aspects, the captured images can be obtained from a single image, where multiple scene primitives are detected in parallel from the single image. It should be appreciated that camera images can be displayed by any other in-vehicle displays, such as a center stack display, and camera images can be from any other interior or exterior vehicle cameras.

As described herein, the processing system 110 receives an image from a camera associated with a vehicle on a road, generates a plurality of views of the environment at issue (e.g., the primitive) based at least in part on the image, and identifies the object in parallel using multiple cores of a processing device in the processing system. The processing system 110 selectively determines which one or more views to generate and process by the parallel processing cores. The processing system 110 is described in more detail with regard to FIG. 2. The processing system 110 can also receive sensor data from the sensor 122, which can be one or more of a light detection and ranging (LIDAR) sensor, a long-range camera, a global positioning system (GPS), etc. The sensor data can be used to enhance the road feature detection.

Figure 2:
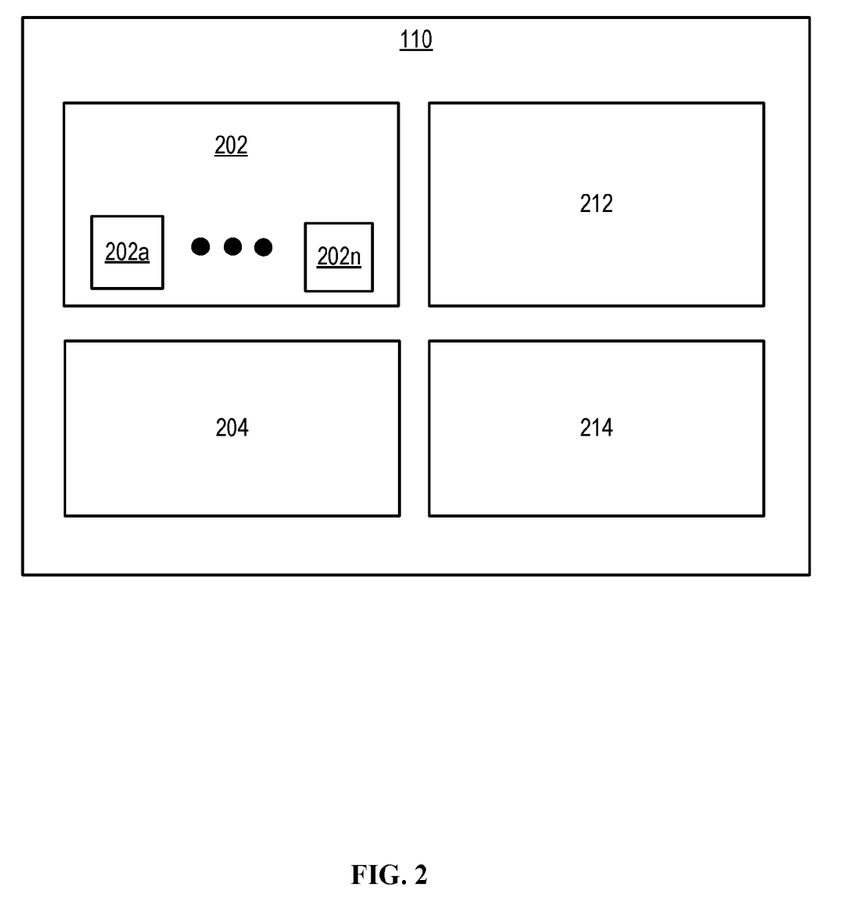
FIG. 2 depicts the processing system of FIG. 1, according to aspects of the present disclosure.

In particular, FIG. 2 depicts the processing system 110 of FIG. 1, according to aspects of the present disclosure. The processing system 110 includes a processing device 202, a memory 204, a view generation engine 212 and a primitive detection engine 214. FIG. 2 is described with respect to the vehicle 100 of FIG. 1.

Processing device 102 can include multiple processing cores 202a-202n. It is appreciated that any number of parallel cores are contemplated, although only two are shown. Processing cores 202a-202n perform parallel computing computation in which many calculations or the execution of processes are carried out simultaneously by each of the processing cores. With parallel processing, large problems involving using machine learning can are divided into smaller problems (e.g., multiple views extracted from one or more camera images) which can then be solved using deep neural networks at the same time (in parallel) by parallel processing cores 202a-202n. There are several different forms of parallel computing: bit-level, instruction-level, data, and task parallelism, among others. It should be understood that, according to embodiments of the present disclosure, various configurations and computational schemes are possible. In all aspects, parallel processing cores 202a-202n apply, at each core, machine learning techniques that utilize a convolutional neural network to process multiple images in parallel.

The various components, modules, engines, etc. described regarding FIG. 2 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these.

In examples, the engine(s) described herein can be a combination of hardware and programming. The programming can be processor executable instructions stored on a tangible memory, and the hardware can include the processing device 202 for executing those instructions. Thus a system memory (e.g., the memory 204) can store program instructions that when executed by the processing device 202 implement the engines described herein. Other engines can also be utilized to include other features and functionality described in other examples herein. Alternatively or additionally, the processing system 110 can include dedicated hardware, such as one or more integrated circuits, ASICs, application specific special processors (ASSPs), field programmable gate arrays (FPGAs), or any combination of the foregoing examples of dedicated hardware, for performing the techniques described herein.

The view generation engine 212 receives an image (e.g., original image 312) from a camera (e.g., one of the cameras 130) of the vehicle 100. The image may include a portion of a road upon which the vehicle 100 is positioned and/or along which the vehicle 100 travels. The view generation engine 212 can generate various views of the road and objects on or around the road (e.g., features) as elementary pieces of the input data. For example, view generation engine may generate a view of the road based at least in part on the image. That is, the view generation engine 212 uses the image to generate a view of the road as if the point of view of the camera was directly above the road looking down at the road. In other aspects, various other views are generated such as, for example, vertical views depicting a forward (central) view of the road and/or objects in front of vehicle 100, side views, rear view, etc.

According to aspects of the present disclosure, the view generation engine 212 uses fisheye camera imaging techniques to generate the image from which the one or more views are captured. Accordingly, cameras 130a-130c may include fisheye camera lenses. When using a fisheye camera, the view generation engine 212 can be calibrated to compensate for radial distortion caused by the fisheye lens using currently available software and processing techniques.

Once the view is generated, the processing system allocates one or more portions of the image(s) to processing cores 202a-202n. Accordingly, processing cores 202a-202n receive the image(s) in parallel, and process aspects of the image to detect scene primitives that are indicative of a vehicle, object, person, etc.

Once the road scene entity is (simultaneously) identified at each of the processing cores 202a-202n, primitive detection engine 214 uses a convolutional neural network to simultaneously identify the primitive in each of the plurality of generated views that show a primitive using machine learning. Accordingly, using each of parallel processing cores 202a-202n, the primitive detection engine 214 searches (in parallel) within the view to detect primitives.

The primitive detection engine 214 can identify the primitive that indicates a road scene entity of interest using each of the processing cores 202a-202n at the same time. The processing cores 202a-202n may identify a single primitive or multiple primitives simultaneously. For example, if the primitive for identification is a road feature, primitive detection engine 214 determines a type of road feature (e.g., a straight arrow, a left-turn arrow, etc.) as well as a location of the road feature (e.g., arrow ahead, bicycle lane to the left, etc.) from one or more of the plurality of images. If the detected primitive is a vehicle, primitive detection engine 214 determines information associated with the type of vehicle detected and identified. For example, primitive detection engine 214 determines the type of vehicle (e.g., bicycle, passenger car, motorcycle, etc.), expected characteristics for that type of vehicle (e.g., size, etc.) and/or geographic proximity to vehicle 100 (e.g., distance and position respective to vehicle 100), among others information. If the primitive detected is a road marking (e.g., a sign, a signal, etc.), primitive detection engine 214 determines the particular sign or signal, determines an intended meaning for the sign or signal, and includes the determination information with the output (described hereafter with respect to FIG. 3). The primitives can be predefined in a database (e.g., a road feature database, a road marking database, etc.), and thus, primitive detection engine 214 may refer to the database to make the determination.

To detect road scene primitives, the primitive detection engine 214 uses machine learning and/or classic computer vision techniques. More specifically, the primitive detection engine 214 can incorporate and utilize rule-based decision making and artificial intelligent (AI) reasoning to accomplish the various operations described herein. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used by the primitive detection engine 214 to detect primitives.

In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. In another embodiment, machine learning functionality can be implemented using a convolutional neural network (CNN). A CNN is a type of feed-forward ANN. Machine learning can be implemented using any suitable type of neural networks.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 3:
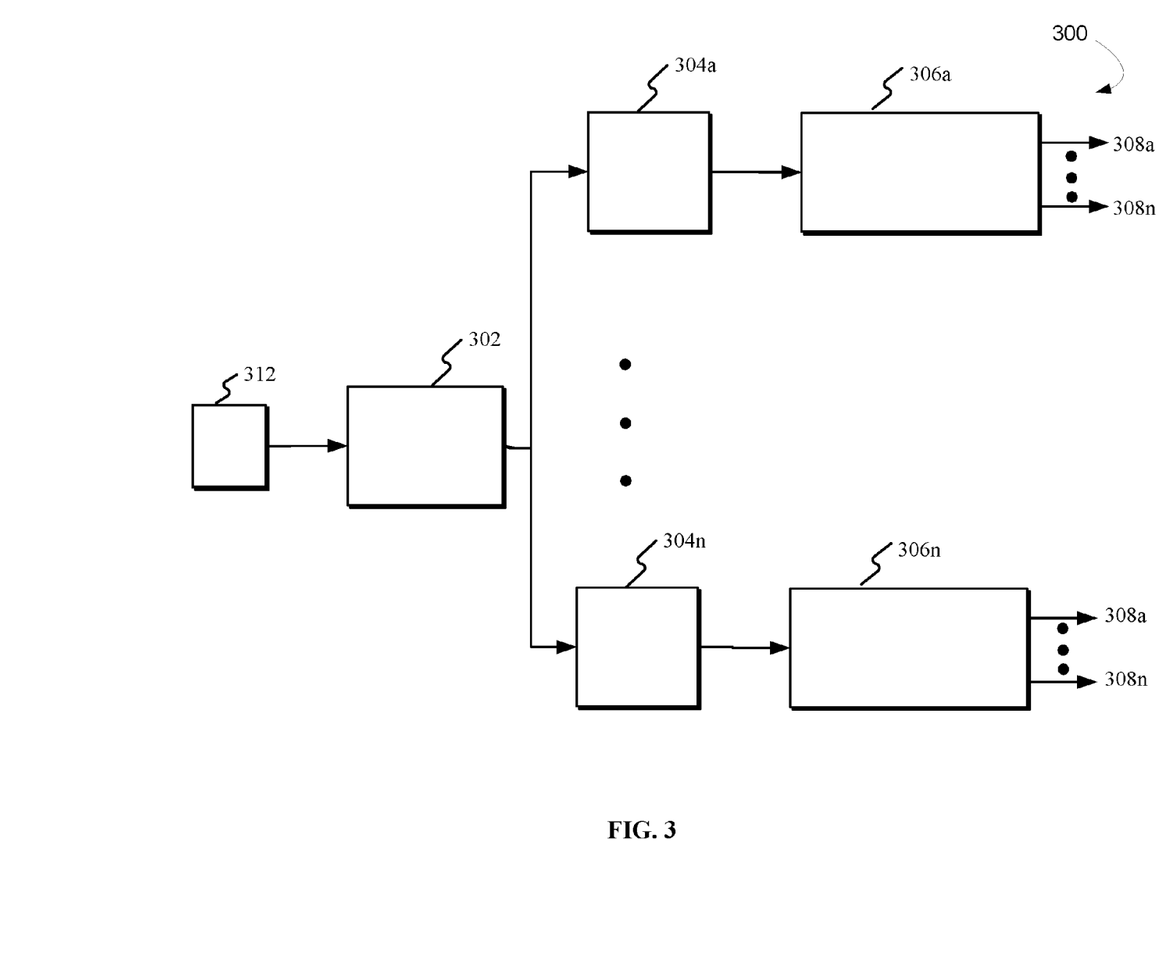
FIG. 3 depicts image processing of images associated with primitive detection, according to aspects of the present disclosure.

FIG. 3 depicts neural network 300 used for detecting primitives, according to aspects of the present disclosure. By way of a general overview of embodiments of the present disclosure, neural network 300 is configured to receive a single image 312 as an input and decompose that single image into multiple aspects for parallel processing by processing cores 202a-202n. The original "fisheye" image 312 is decomposed by a decomposition section 302 into multiple top-down and vertical views that differentiate one or more primitive occurrence(s), which are then fed into separately trained deep neural nets for simultaneous multi-primitive detection and classification in parallel. For example, a single image 312 may be of a street scene taken as a fisheye image. Image 312 may include visual information sufficient for the processing device 202, via decomposition section 302, to decompose (divide) the image 312 into multiple views. Each of the multiple views may show various aspects of the same primitive, or may show one or more aspects of the different primitives. Each view is sent to a respective feature extraction section 304a . . . 304n of processing cores 202a-202n. An aspect of a primitive may be, for example, a rear view of a passing vehicle. Another aspect may be, for example, a left-biased rear view of the same passing vehicle. Another aspect may, for example, be a top-down view of the passing vehicle, and one or more other objects proximate to the passing vehicle. The one or more other objects are considered a second primitive that is different from the passing vehicle (a first primitive). Therefore, both of the first primitive and the second primitive can be captured in some or all of the various views deconstructed from the single fisheye image. According to embodiments described herein, each of the various deconstructed views taken from the single image 312 are assigned to a corresponding one of processing cores 202a-202n for simultaneous processing. The simultaneous processing can include, at each individual core, identifying one or more primitives that indicate a road scene entity of interest in the view via a feature classification section 306a . . . 306n, respectively.

Figure 4:
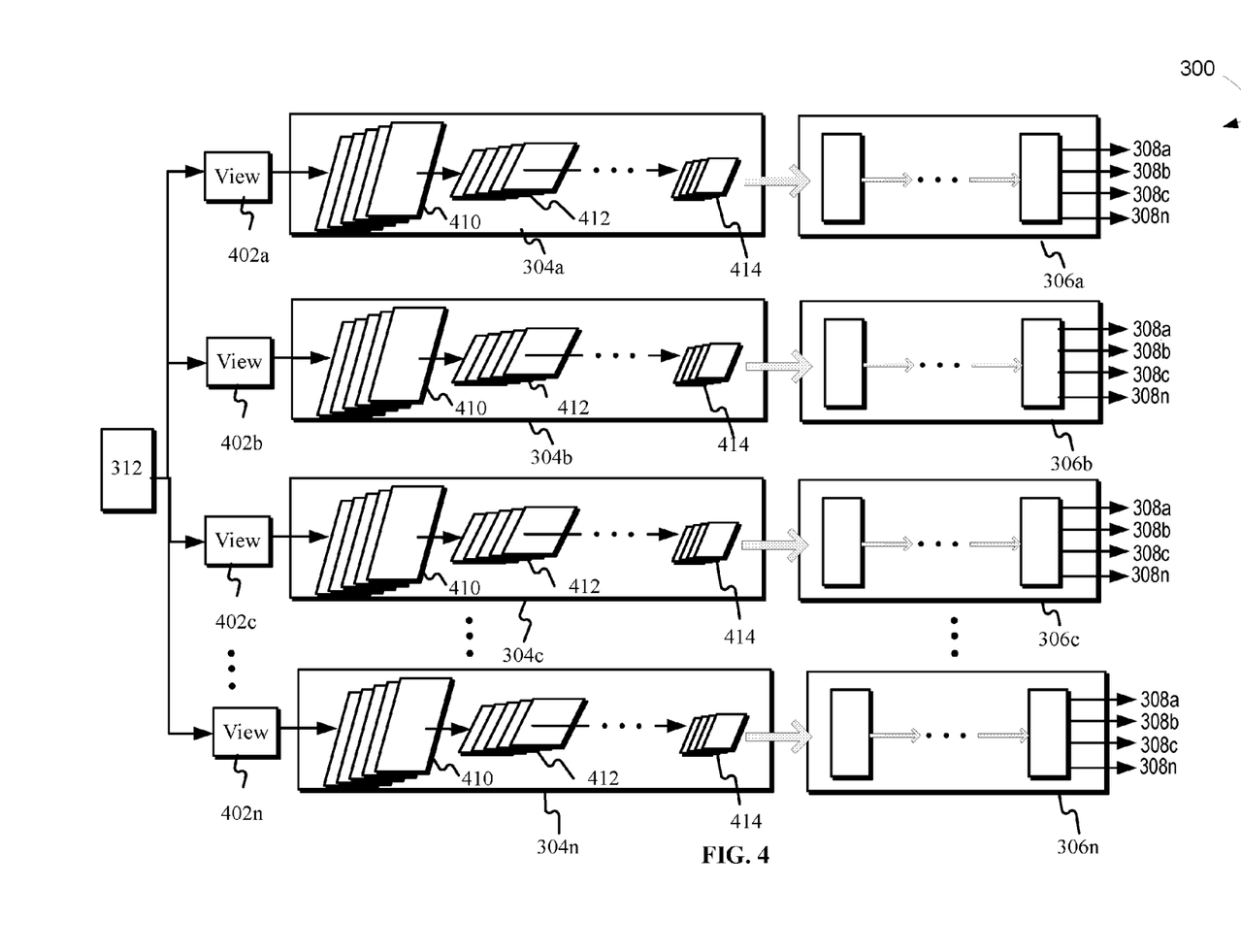

Considering embodiments in greater detail, FIG. 4 is considered now in conjunction with FIG. 3. FIG. 4 depicts another view of neural network 300, according to aspects of the present disclosure. The processing device 202 receives an image 312 from one or more of cameras 130a-130d. Decomposition section 302 (shown in FIG. 3) receives the image 312, and decomposes the image into constituent parts (views 402a, 402b, 402c . . . 402n). Each of views 402a-402n are derived from image 312. According to one embodiment, decomposition section 302 determines which views of interest are to be extracted from the single image. The determination is based on various factors including the probability that an identified portion of the image contains an entity of interest, and the number of entities of interest within a potential view of the image, among other factors.

The feature extraction section (304a-304n, respectively) in each of the parallel processing cores 202a-202n uses a neural network to extract intermediate features 412 as feature maps. Each view 402a-402n is processed in parallel to output primitives 308a-308n. The processing steps shown for view 402a will be described as an example of the parallel image processing occurring at each processing core simultaneously. Referring first to the upper-most processing line in FIG. 4, the feature extraction section 304a identifies one or more primitive features in view 402a, and analyzes the features at different levels (depicted as feature maps 410, 412, and 414). Accordingly, the feature extraction section 304a outputs feature map 414 to the feature classification section 306a to classify the primitives using feature maps 414 based on primitives stored in an operatively connected database of primitives (not shown). The feature classification section 306a identifies a feature primitive from each of the one or more of the plurality of feature maps 414 with each of the at least two parallel processing cores using machine learning. The classification section 306a-306n outputs the primitives 308a-308n, which can be road scene entities commonly encountered in vehicle driving scenarios. The primitives 308a-308n may be, for example, pedestrians, traffic signs, traffic signals, road features, speed limit indicators, bicycle lane indicators, railroad indicators, school zone indicators, direction indicators, etc.

Although described for example as the processing of view 402a, it should be appreciated that the primitive detection engine 214, using the feature extraction sections 304a-304n and classification sections 306a-306n can detect multiple primitives in parallel as a single step and in real-time. By using machine learning, computational inefficiency and accuracy limitations in existing primitive detection can be reduced.

Figure 5:
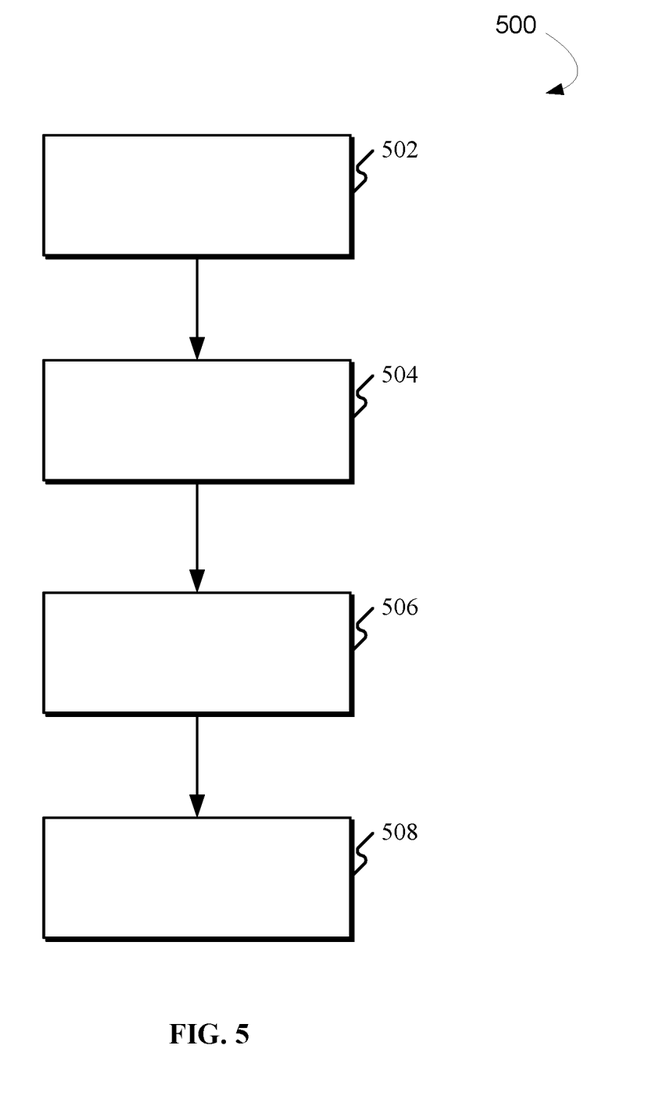
FIG. 5 depicts a flow diagram of a method for primitive detection, according to aspects of the present disclosure.

FIG. 5 depicts a flow diagram of a method 500 for primitive detection, according to aspects of the present disclosure. The method 500 can be implemented, for example, by the processing system 110 of FIGS. 1 and 2, by the processing system 600 of FIG. 6, or by another suitable processing system or device.

At block 502 the processing system 110 receives at least one image from a camera associated with a vehicle on a road. Processing system 210 includes at least two parallel processing cores 202a-202n that receive the one or more images.

At block 504 the view generation engine 212 generates a plurality of views from the one or more images. At least one of the images includes a feature primitive. The feature primitive indicates the presence of a vehicle and/or another road scene entity of interest to operation of vehicle 100. For example, the primitive can be one of a pedestrian, a traffic sign, a traffic signal, a road feature, etc.

At block 506, the primitive detection engine 214 identifies a feature primitive from one or more of the plurality of views with each of the at least two parallel processing cores using machine learning. Each of the parallel processing cores 202a-202n may identify the road scene entity in a separate portion of the one or more of the plurality of views. Using machine learning (e.g., a convolutional neural network, an artificial neural network, etc.) the primitive detection engine 214 can perform feature extraction from the view (within the lane boundaries) using a neural network. After extracting the feature, the primitive detection engine 214 performs a classification of the feature primitive using the neural network (e.g., determines what kind of primitive). The primitive detection engine 214 identifies the feature primitive by performing, at each parallel processing core, a feature extraction to extract the feature primitive from one view using a neural network. Once the feature primitive is classified, primitive detection engine 214 has identified the feature primitive.

At block 508, the primitive detection engine 214 outputs, based on the plurality of views, a set of result road scene primitives in parallel. The set of result road scene primitives are based on the identified road scene entity. A set of result road scene primitives is a set containing the road scene primitives processed in parallel by the processing cores. The road scene primitives contain one or more entities of interest to operation of motor vehicle 100 that are encountered on the road.

Additional processes also can be included, and it should be understood that the processes depicted in FIG. 5 represent illustrations and that other processes can be added or existing processes can be removed, modified, or rearranged without departing from the scope and spirit of the present disclosure.

Figure 6:
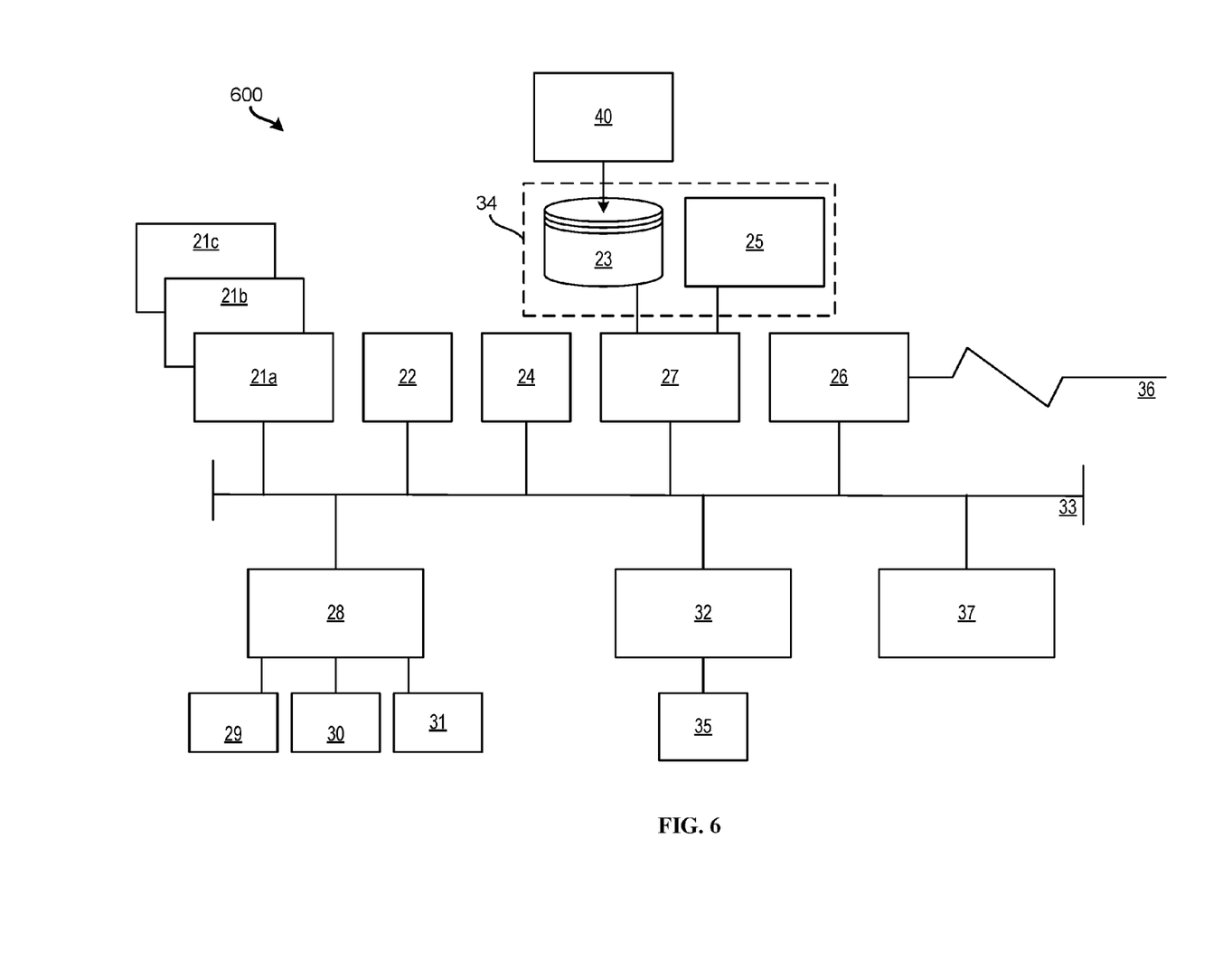
FIG. 6 depicts a block diagram of a processing system for implementing the techniques described herein, according to aspects of the present disclosure.

It is understood that the present disclosure is capable of being implemented in conjunction with any other type of computing environment now known or later developed. For example, FIG. 6 illustrates a block diagram of a processing system 600 for implementing the techniques described herein. In examples, processing system 600 has one or more central processing units (processors) 21a, 21b, 21c, etc. (collectively or generically referred to as processor(s) 21 and/or as processing device(s)). In aspects of the present disclosure, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 600.

Further illustrated are an input/output (I/O) adapter 27 and a network adapter 26 coupled to system bus 33. I/O adapter 27 can be a small computer system interface (SCSI) adapter that communicates with a hard disk 23 and/or other storage drive 25 or any other similar component. I/O adapter 27, hard disk 23, and storage device 25 are collectively referred to herein as mass storage 34. Operating system 40 for execution on processing system 600 can be stored in mass storage 34. A network adapter 26 interconnects system bus 33 with an outside network 36 enabling processing system 600 to communicate with other such systems.

A display (e.g., a display monitor) 35 is connected to system bus 33 by display adaptor 32, which can include a graphics adapter to improve the performance of graphics intensive applications and a video controller. In one aspect of the present disclosure, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

In some aspects of the present disclosure, processing system 600 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system to coordinate the functions of the various components shown in processing system 600.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes can be made and equivalents can be substituted for elements thereof without departing from its scope. In addition, many modifications can be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented parallelization method comprising:

receiving, by a processing device having at least two parallel processing cores, at least one image from a camera associated with a vehicle on a road;

generating, by the processing device, a plurality of views from the at least one image that include a feature primitive indicative of one or more road scene entities of interest;

identifying a road scene entity from one or more of the plurality of views with each of the at least two parallel processing cores simultaneously using one or more of machine learning and a computer vision technique, wherein the at least two parallel processing cores each identify the road scene entity in a separate portion of the one or more of the plurality of views; and outputting, based on the plurality of views, a set of result road scene primitives in parallel based on the identified road scene entity.

2. The computer-implemented method of claim 1, wherein the set of result road scene primitives is indicative of a road scene entity comprising one of a pedestrian, a traffic sign, a traffic signal, and a road feature.

3. The computer-implemented method of claim 1, wherein the machine learning utilizes a convolutional neural network.

4. The computer-implemented method of claim 1, wherein identifying the road scene entity at each parallel processing core further comprises:
performing, at each parallel processing core, a feature extraction to extract the road scene entity from one view using a neural network; and
performing a classification of the road scene entity using the neural network.

5. The computer-implemented method of claim 1, wherein one parallel processing core identifies the road scene entity from a different view than another of the parallel processing cores.

6. The computer-implemented method of claim 5, further comprising identifying at least two different road scene entities and outputting a result indicative of the two different road scene entities.

7. A system for parallelization, the system comprising:
a plurality of cameras associated with a vehicle;
a memory comprising computer readable instructions; and
a processing device having at least two parallel processing cores configured to:
receive at least one image from a camera associated with a vehicle on a road;
generate a plurality of views from the at least one image that include a feature primitive indicative of one or more road scene entities of interest;
identify a road scene entity from one or more of the plurality of views with each of the at least two parallel processing cores simultaneously using one or more of machine learning and a computer vision technique, wherein the at least two parallel processing cores each identify the road scene entity in a separate portion of the one or more of the plurality of views; and
output, based on the plurality of views, a set of result road scene primitives based on the identified road scene entity.

8. The system of claim 7, wherein the set of result road scene primitives is indicative of a road scene entity comprising one of a pedestrian, a traffic sign, a traffic signal, and a road feature.

9. The system of claim 7, wherein the machine learning utilizes a convolutional neural network.

10. The system of claim 7, wherein identifying the road scene entity at each parallel processing core further comprises:
performing, at each parallel processing core, a feature extraction to extract the road scene entity from one view using a neural network; and
performing a classification of the road scene entity using the neural network.

11. The system of claim 7, wherein one parallel processing core analyzes a different view than another of the parallel processing cores.

12. The system of claim 11, further comprising identifying at least two different feature primitives and outputting a result indicative of the two different feature primitives.

13. The system of claim 7, wherein the camera comprises a fisheye lens.

14. A computer program product for parallel scene primitive detection, the computer program product comprising:
a computer readable storage medium having program instructions embodied therewith, wherein the computer readable storage medium is not a transitory signal per se, the program instructions executable by a processing device having at least two parallel processing cores to cause the processing device to perform a method comprising:
receiving, by a processing device having at least two parallel processing cores, at least one image from a camera associated with a vehicle on a road;
generating, by the processing device, a plurality of views from the at least one image that include a feature primitive indicative of one or more road scene entity of interest;
identifying a road scene entity from one or more of the plurality of views with each of the at least two parallel processing cores simultaneously using one or more of machine learning and a computer vision technique, wherein the at least two parallel processing cores each identify the road scene entity in a separate portion of the one or more of the plurality of views; and
outputting, based on the plurality of views, a set of result road scene primitives in parallel based on the identified road scene entity.

15. The computer program product of claim 14, wherein the set of result road scene primitives is indicative of a road scene entity comprising one of a pedestrian, a traffic sign, a traffic signal, and a road feature.

16. The computer program product of claim 14, wherein the machine learning utilizes a convolutional neural network.

17. The computer program product of claim 14, wherein identifying the feature primitive at each parallel processing core further comprises:
performing, at each parallel processing core, a feature extraction to extract the road scene entity from one view using a neural network; and
performing a classification of the road scene entity using the neural network.

18. The computer program product of claim 14, wherein one parallel processing core identifies the road scene entity from a different view than another of the parallel processing cores.

19. The computer program product of claim 18, further comprising identifying at least two different road scene entities and outputting a result indicative of the two different road scene entities.

20. The computer-implemented method of claim 1 further comprising:
    identifying and classifying the feature primitive;
    determining a road feature type in response to the classification of the feature primitive being a road feature;
    determining a vehicle feature type in response to the classification of the feature primitive being a vehicle; and
    determining a sign or signal in response to the classification of the feature primitive being a road marking.

* * * * *